Dec. 22, 1953 — R. T. SAVAGE ET AL — 2,663,677
PROCESSING HYDROCARBONS
Filed Feb. 28, 1950
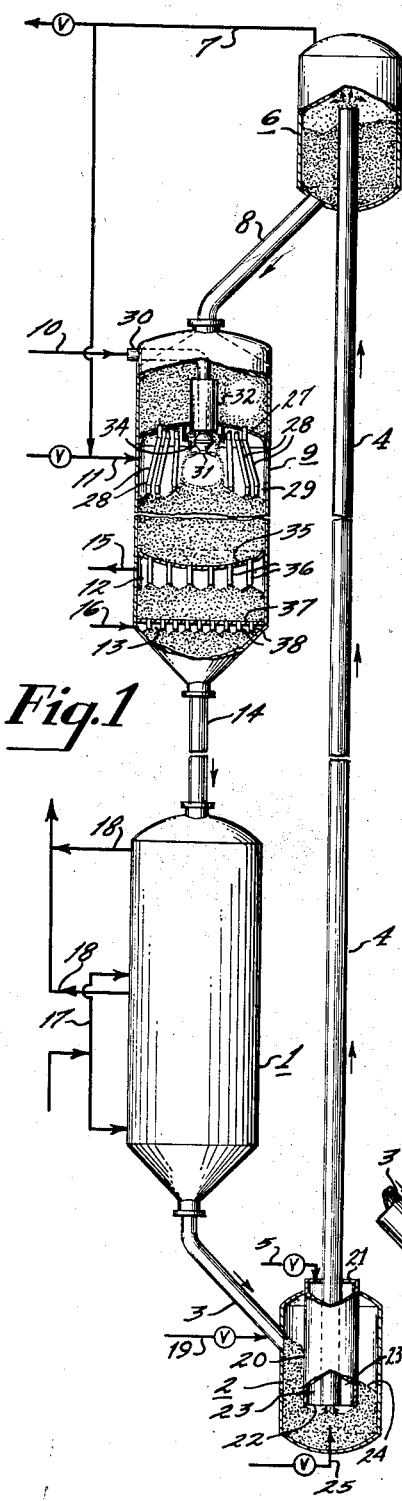
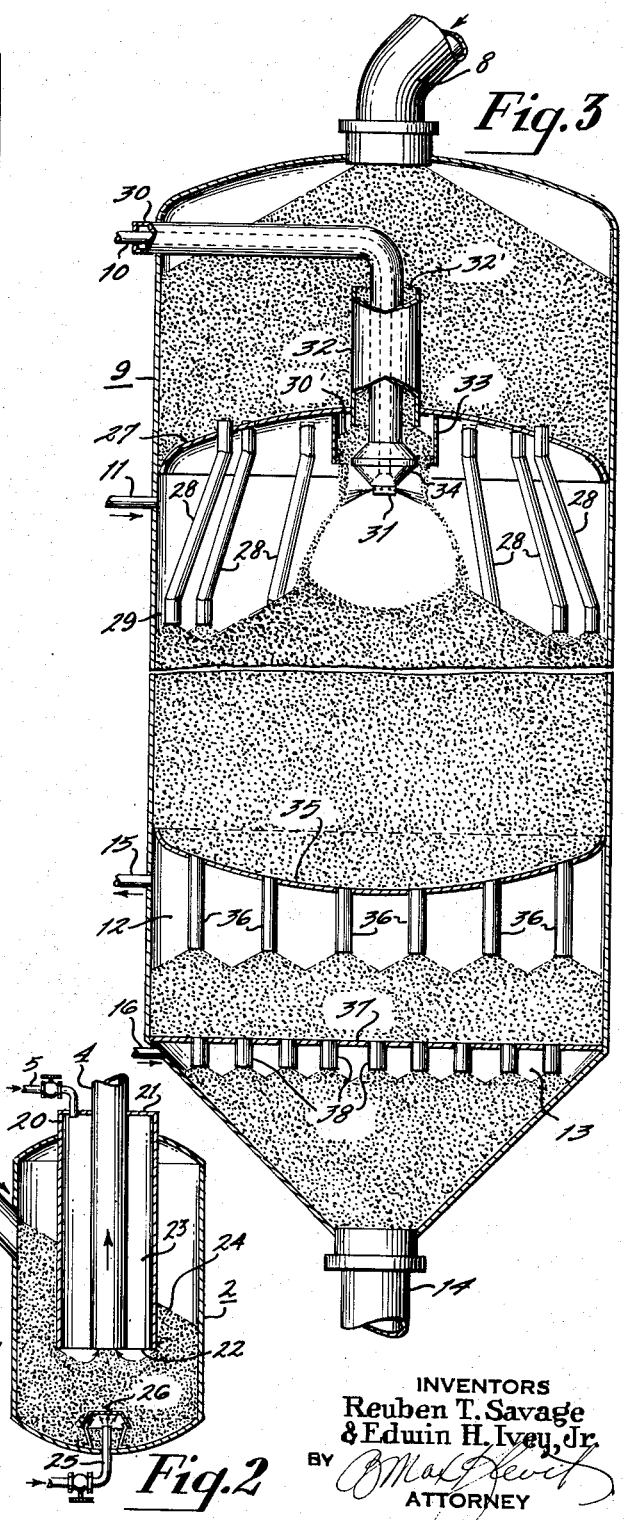
INVENTORS
Reuben T. Savage
& Edwin H. Ivey, Jr.
BY
ATTORNEY Patented Dec. 22, 1953

2,663,677

UNITED STATES PATENT OFFICE 2,663,677

PROCESSING HYDROCARBONS

Reuben T. Savage, Ridley Park, and Edwin H. Ivey, Jr., Glenolden, Pa., assignors to Houdry Process Corporation, Wilmington, Del., a corporation of Delaware Application February 28, 1950, Serial No. 146,646

10 Claims. (Cl. 196—52)

The present invention relates to methods and arrangements for cracking or other conversion or processing of hydrocarbons in contact with a granular contact mass, and is particularly directed to improvements in the operation of these systems wherein the granular contact mass is circulated in use through separate zones or reaction vessels in which such mass is contacted respectively with hydrocarbons to be converted and with a regenerating medium adapted to remove coke deposited therein as a result of such contact with hydrocarbons. The invention is particularly concerned with those systems and operations wherein the granular contact mass in the course of such circulation is elevated from a lower to an upper level in the system under the impelling influence of a fluid stream.

In accordance with the present invention, catalyst or other granular contact mass at elevated temperature is lifted by a vapor stream including crackable hydrocarbon vapors, said stream being substantially free from significant amounts of unvaporized liquid. During lifting of the granular mass thereby, the hydrocarbons are heated and may be partially converted. At the top of the lift, vapor products are separated from the granular mass and the granular mass passed to a liquid contact zone. In this zone the hot granular mass is contacted with cooler liquid hydrocarbons to effect vaporization of the liquid, which may be accompanied by partial conversion to lower boiling products, and the vapors thus formed together with the hydrocarbon vapors from the disengaging zone, are passed through a compact descending bed of the same hot granular mass at lowered temperature to effect further reaction and conversion of these vapors. The quantity of the hydrocarbon vapors so employed for lifting the contact mass is limited so as not to reduce the temperature and heat content of the contact mass during elevation below a minimum required for (1) subsequent vaporization of the liquid hydrocarbons contacted therewith, (2) for heating such hydrocarbons to desired conversion temperature, and (3) to furnish the heat and temperature required for maintaining the conversion reactions in the compact bed reaction zone.

In order to provide catalyst or other granular contact mass in the compact bed reaction zone at above the required average conversion temperature, it will be understood that the granular mass must be at some higher temperature before being cooled by the liquid previously contacted therewith. The maximum temperature to which catalyst can be heated during regeneration or otherwise without excessive deactivation thereof, provides only a relatively narrow range of temperature swing between that temperature and conversion temperatures employed. For this reason as well as for reasons of heat conservation, excessive cooling of the catalyst or other contact mass in the lift is to be avoided. Accordingly, in practice of the invention, in order that the contact mass will not be cooled by more than about 100° F., the quantity of cooler hydrocarbon vapors employed in lifting thereof is limited, to maintain catalyst to oil ratios in excess of about seven parts catalyst to one of oil by weight. Under these conditions the desired temperature and heat content of the contact mass can be conserved while operating at efficient lifting conditions.

In practice of the invention, freshly regenerated catalyst or other hot granular contact mass, at the required temperature is continuously supplied to a transfer zone or hopper to form a bed of the contact mass at the foot of and surrounding a vertical lift conduit. The vapor stream, which comprises a vaporized hydrocarbon charge, including components boiling above the range of gasoline, is passed into the bed of contact mass under pressure to effect elevation of granular material from the bed into and through the lift conduit to an expanded discharge area in a disengaging vessel at the top of said conduit, and wherein as a result of loss of velocity in the expanded area the contact mass settles out from the suspending vapors. The contact mass thus separated, passes to the liquid contact zone in the same or in a separate vessel, wherein the hot granular mass is contacted with a cooler charge of liquid hydrocarbons and the liquid charge is thus vaporized by the transfer of heat from the granular contact mass and is at least partially converted to lower boiling products.

The liquid contact zone is preferably located directly above the descending compact bed of catalyst or other granular contact mass in a reactor, in which the principal conversion of the hydrocarbon vapors passed through the bed takes place. Distribution of liquid hydrocarbons in the contact mass is advantageously effected by spraying the liquid into a freely falling stream or curtain of the contact mass. By charging the liquid hydrocarbons above the compact bed reactor in the manner described while employing only vaporized hydrocarbons for lifting the catalyst, control of the lifting operation is simplified and the problems incident to coking of the liquid charge, that may arise when introducing liquid hydrocarbons into the lift transfer hopper, are avoided.

The described operation in accordance with the invention offers additional advantages from the standpoint of efficiency and economy of operation as applied for instance in catalytic cracking. That part of the total hydrocarbon charge to be converted which is supplied to the catalyst in vapor form, will generally be constituted by the relatively more refractory lower boiling ends as compared with the higher boiling portion of a crude oil that may advantageously be contacted with the catalyst in liquid state. The initial use of higher temperatures with these more refractory hydrocarbons can therefore be resorted to, consistent with desired extent of conversion. Even so, moreover, the contact time of the hydrocarbon vapors with the hot contact mass during lifting is relatively short, and does not result in overcracking to produce excessive amounts of coke and dry gas. Cracking of these vapors is then subsequently completed to required extent and under controlled conditions at the desired lower temperature of the compact bed of contact mass.

The arrangement in accordance with the invention permits wide flexibility in the selection of operating conditions. The catalyst to oil ratio, temperature of conversion and space rate utilized in the compact bed reaction zone are subject to independent choice and control and are not fixed by conditions prevailing during lifting of the contact mass by the hydrocarbon vapors, so that the process variables can be selected for the major portion of the conversion reactions to suit the particular stock and/or to obtain the desired product distribution.

The invention offers particular advantages in the cracking of heavy hydrocarbon charge stocks containing components which are not readily vaporized at cracking temperatures. Thus such a charge, which may be a topped crude, may be separated in known manner, as by flash distillation, into vapor and liquid fractions, the vapor fraction being sent to the transfer hopper for elevation of catalyst therein, while the liquid fraction is contacted with the still hot catalyst in a separate zone under conditions assuring uniformity of distribution on the catalyst. The liquid charge may be or include gas oil condensed from effluent products of the cracking operation, which is recycled for further cracking in the compact bed reactor. Such recycle oil being available at comparatively low temperature is vaporized and heated to desired conversion temperature by direct heat exchange with the hot catalyst above the compact bed in the reactor. By employing hydrocarbon vapors substantially free from liquid components as the lift medium, better control and more efficient operation of the lift is obtained, since the influence on the ascending granular mass of vapors produced by vaporization of liquid hydrocarbons in the lift conduit, is thereby avoided.

The details of the invention will be understood and other advantages thereof appreciated from the description which follows read in connection with the accompanying drawings; wherein Figure 1 is a schematic process flow diagram of one arrangement of the processing vessels adapted to practice of the invention;

Figure 2 is a vertical elevation, partly in section, of the lift transfer hopper; and Figure 3 is a longitudinal section through the reactor.

In the processing arrangement illustrated in Figure 1, hot freshly regenerated catalyst or other contact mass is discharged from the kiln 1 into the lift transfer hopper 2 through a seal leg 3. From a bed of the same thus formed in the hopper 2, the catalyst is elevated into lift conduit 4, extending vertically upward from within the hopper, under the impelling influence of vapors introduced under pressure into that hopper by means of one or more vapor inlet lines 5. The vapors employed for lifting the catalyst may consist of hydrocarbon vapors or comprise the same mixed with compatible non-reacting gas or vapor such as steam.

The lift conduit 4 at its upper end discharges into an expanded area in disengaging vessel 6, wherein as a result of decreased velocity incident to the expanded cross section, the catalyst separates out from the vapor stream. The vapor stream thus disengaged is withdrawn overhead through discharge line 7 while the catalyst falls to the bottom of the vessel 6.

From the vessel 6 the catalyst is discharged through a run-down leg 8 into the introduction chamber provided at the top of reactor vessel 9. Hydrocarbons in liquid state are introduced into the vessel 9, in a manner hereinafter described through a liquid feed line 10, and hydrocarbon vapors are introduced into the reactor vessel through line 11 which is in flow communication with discharge line 7. In the reactor vessel 9 catalyst descends by gravity as a compact bed thereof, passing through a vapor disengaging zone 12 and a purge zone 13 prior to discharge from the reactor vessel through the seal leg 14. The disengaged vapors are withdrawn from the reactor vessel through line 15 and the purge medium, which may be steam or other inert gas, is admitted to the purge zone through line 16. A portion of the purge gas thus introduced through line 16 passes upwardly through the catalyst bed into the vapor disengage zone 12, while another portion of the gas flows concurrently with the catalyst through leg 14 and into the kiln 1 to provide a pressure seal between the reaction vessel 9 and the kiln 1.

The catalyst in the kiln 1, which contains carbonaceous deposit formed during conversion of hydrocarbons in contact therewith, descends through the kiln 1 and is contacted therein with an oxygen-containing gas introduced at one or more levels of the kiln through appropriate lines 17, to effect combustion of the carbonaceous deposit, and results in the production of a flue gas which is discharged from the kiln at one or more levels through suitable lines 18. Under some conditions the kiln may be provided with cooling areas in the manner well known to the art. The freshly regenerated catalyst is discharged from the kiln through the seal leg 3 as hereinbefore described for repetition of the recited cycle.

To prevent admixture of incompatible gases, inert seal gas, such as steam, is flowed through the leg 3; which seal gas may be admitted through line 19 into the leg 3 at a pressure somewhat above that prevailing at the foot of conduit 4.

As more particularly shown in Figure 2, admission of lift vapors into the hopper 2 is effected through a sleeve 20 surrounding the lower portion of conduit 4, said sleeve being closed at its top end as indicated at 21 and open at its lower end 22, forming an annular chamber 23 between the inner wall of the sleeve and the outer wall of conduit 4. Continuous flow of the catalyst into the hopper 2 results in the formation of a bed therein maintained at a level 24 above the inlet to lift conduit 4 and the bottom 22 of sleeve 20. To reduce resistance in the catalyst bed below the conduit 4 and to facilitate suspension of catalyst in and transportation by the annular stream discharged at the foot of the channel 23, an auxiliary vapor inlet may be provided at or near the bottom of hopper 2 as indicated at 25, through which inlet vapors are passed upwardly into the catalyst bed, and in admixture with the vapors introduced through line 5 pass into lift conduit 4 together with suspended catalyst. The vapors introduced through lines 5 and 25 may be of the same or different composition; thus hydrocarbon vapors may be introduced through line 5 and steam or other inert gas may be admitted through line 25. A suitable baffle or screen 26 may be provided above the open end of line 25 to prevent granular material from falling into the line.

The construction and arrangement of one form of reactor vessel adapted for use in the practice of the invention is particularly illustrated in Figure 3. As shown in this figure, there is provided near the upper end of vessel 9 a horizontal partition in the form of a tube sheet 27, provided therebelow with a plurality of downcomer tubes 28, through which a portion of the catalyst admitted into the vessel through leg 8 descends to form a compact bed therein below the discharge ends of the tubes as indicated at 29, and thereby providing a plenum chamber for vapor between the upper surface of the bed 29 and the under surface of the tube sheet 27. The liquid feed line 10 enters the vessel 9 through a surrounding sleeve 30. The sleeve 30 is provided with an outwardly tapered lower section 30' and is inwardly tapered therebelow, to terminate in a spray head 31. The head 31 is in communication with the discharge outlet of line 10, and through this head the liquid hydrocarbons are atomized or sprayed. Extending above the tube sheet 27 the sleeve 30 is surrounded by an open ended housing member 32 forming a passage 32', through which catalyst from the introduction chamber formed above the tube sheet descends freely, and is discharged above the enlarged portion of sleeve 30. An additional cylindrical housing member 33 supported below the tube sheet is provided with an inwardly directed flange spaced from the sides of sleeve 30 to provide an annular passage 34 through which the catalyst flows as a freely falling annular curtain past the spray discharged through the head 31 and onto the surface of the compact bed 29 therebelow. The spray head 31 may be of a type which produces fog, mist, spray, or other liquid particles having suitable dimensions from the liquid hydrocarbon admitted thereto. The inner edges of flanges 34 are spaced from the enlarged lower end of the sleeve 30 a suitable distance to provide a relatively thick curtain of the freely falling catalyst, to entirely or at least sufficiently prevent passage therethrough of any of the atomized liquid directed into engagement therewith by the spray head 31. By this arrangement migration of atomized liquid material to deposit on interior surfaces within the vessel 9 is minimized, avoiding deleterious formation of carbonaceous deposits on such surfaces.

The liquid charge contacted with the falling curtain of hot catalyst is vaporized or at least partly converted to vapor products, which vapors together with the vapor products admitted through line 11 pass downwardly through the compact bed of catalyst in the vessel 9, which bed is supported on a lower horizontal partition 35. Below the partition 35 there are provided downcomer tubes 36 through which the catalyst descends to form a compact layer supported by a tube sheet 37, and providing between the upper surface of the layer and the bottom of partition 35, the vapor disengaging space 12. This space is in communication with the discharge outlet 15 through which the vapor conversion products are withdrawn. The tube sheet 37 is provided with downcomer nipples 38 in the purge zone 13, so that steam or other purge gas admitted through line 16 passes upwardly through the nipples and through the layer of catalyst above the tube sheet 37 entering the disengaging space 12 for withdrawal together with hydrocarbon vapors through the outlet 15. A portion of the steam or other purge gas thus admitted passes downwardly through the seal leg 14 as hereinbefore described.

The cross-sectional area of passage 34 as determined by the spacing between the flange on the member 33 and the enlarged portion of sleeve 30, fixes the proportion of catalyst that is contacted with liquid. The determination of these relative portions will be governed, among other factors, by required heat transfer relations, including temperature and quantity of the liquid oil and the temperature of the catalyst in the falling curtain. As a general rule, in practical operation, at least half of the catalyst will be passed through the passage 34 for contact with liquid, and preferably at least 75% of the total catalyst admitted to the compact bed reactor up to 100% thereof will be thus subjected to contact with liquid hydrocarbons. In the latter case, it will be understood, the downcomer tubes 28 may be omitted or plugged.

The illustrated embodiment of contacting the liquid hydrocarbons with a freely falling curtain of catalyst represents the preferred operation. If desired, however, the liquid may be discharged or sprayed onto the surface 29 of the compact bed, provision being made for substantially uniform distribution of the liquid on the catalyst. Whether the falling curtain or the direct introduction of liquid on the surface of the bed is employed, the quantity of liquid must not be in excess of that which, if not immediately vaporized, will be absorbed by the catalyst, so that no significant quantity of free or unadsorbed liquid is present in the bed beyond a short distance from the top theerof, as at below the upper fifth of the compact bed. By thus controlling the proportion of liquid to catalyst mass flow rates, the catalyst will be cooled to only the desired extent and will be available in the compact bed with sufficient heat content and at a temperature required to effect the desired further catalytic cracking of the vapors.

In typical operations employing for instance cracking catalyst in the form of beads or cylindrical pellets of about 4 mm. size, the hydrocarbon vapor feed may be admitted through line 5 and thereby into hopper 2 at a temperature of about 750 to 900° F. to engage the freshly regenerated catalyst admitted to that hopper at a higher temperature, generally above 900° and up to about 1100° F. or somewhat above. As a result of heat exchange and some conversion of the hydrocarbon vapors in contact with the catalyst during passage into and through the lift conduit 4, the catalyst and vapors will substantially reach an equilibrium temperature of about 900–1050° F. The liquid charge, for instance liquid condensate above the boiling point of recovered gasoline from the cracking operation, is admitted through line 10 for discharge through the spray head 31, at a temperature of about 450–650° F., thus providing an average desired reaction temperature in the compact bed reactor, usually from about 800–900° F. or somewhat above. In order to provide the desired reaction temperature and sufficient heat in the catalyst to effect vaporization of the liquid charge and to supply heat required for subsequent cracking, the catalyst should be admitted to the introduction chamber above the tube sheet 27 at a temperature of not less than about 900° F. and preferably no lower than at about 950° F., and accordingly, the temperature and quantity of the lift vapors must be regulated with respect to the temperature and quantity of catalyst lifted thereby, so that the stated catalyst temperature is had for contact with the liquid hydrocarbon feed. Moreover, the contact time of hydrocarbon vapors with the catalyst in the lift conduit should also be maintained below a certain maximum, to avoid excessive cracking in the lift at the high temperature prevailing, that may tend to produce undesirable production of relatively large amounts of coke and gas, and to avoid complications of uncontrolled acceleration of catalyst velocity incident to increase in vapor volume, and further complications in disengagement of the catalyst from such increased quantity of vapors. For these reasons it is generally preferred to so operate the lift that the vapors do not remain therein for more than about 10 to 15 seconds, and preferably for a shorter time.

The following example illustrates one set of specific conditions adapted for practical operation of the process:

The vapor charge employed as fresh feed is made up of approximately 82% tar separator overhead fraction from a West Kansas crude oil, said fraction having an API gravity of 31.5 and boiling over the approximate range of 600–1000° F.; about 14% vis-breaker gas oil of 24.7 API gravity boiling in the approximate range of 500–1100° F., and the remainder being vis-breaker products of 57.0 API gravity in the gasoline boiling range which may contain some gas.

The combined vapor oil charge is admitted to the lift hopper at a temperature of 840° F. under a pressure of 11.5 p. s. i. gauge together with about 15% by weight steam, the major part of which steam is brought in together with the oil charge admitted to the hopper through line 5, and the remainder of the steam being admitted separately as diffuser gas through line 25. Seal steam is also admitted to leg 3.

The catalyst employed is pelleted acid-activated clay of 4 mm. size, which enters the lift hopper from the kiln at a temperature of 1075° F. The ratio of catalyst to hydrocarbon vapors entering the lift is approximately 10/1 by weight.

The catalyst and charge obtain an equilibrium temperature of about 1025° F. during their flow through the lift conduit and are admitted to the receiving section above the tube sheet 27 in reactor 9 at about that temperature.

The liquid feed admitted to the reactor through line 10 is recycled catalytic gas oil, which is supplied at the rate of approximately 85% by weight of fresh oil feed admitted to the lift hopper. The liquid feed, of 28.5 API gravity and boiling over the approximate range of 600–900° F., is admitted at a temperature of 500° F. and is sprayed on a freely falling curtain of the hot catalyst. The vapors thus produced, together with the vapors from the lift, then pass through the descending compact bed of catalyst in reactor 9 to complete the desired cracking, producing a vapor effluent which is discharged at about 890° F. under a pressure of 6 p. s. i. gauge and sent to fractionation in known manner. Under the described operation the conversion conditions in contact with the compact bed of catalyst in reactor 9 entail an average temperature of about 900° F., an average pressure of 7.5 p. s. i. gauge, and a catalyst to oil weight ratio of about 5.2/1. About 0.7% to about 0.8% coke will be deposited in the catalyst.

The coked catalyst enters the kiln at about 890° F. and is burned by contact with air, raising the temperature and storing sensible heat therein. After completion of regeneration, the catalyst is contacted with steam to effect hydration thereof, thereby adjusting the temperature to that hereinbefore described for its further use in the process.

The present application describes certain subject matter in common with our application Serial No. 124,056, and to that extent is a continuation-in-part thereof.

We claim as our invention:

1. The method which comprises flowing a vapor stream into a body of hot freshly regenerated granular cracking catalyst under pressure to effect suspension of catalyst in the stream, said vapor stream essentially comprising crackable hydrocarbons and being substantially free of unvaporized liquid hydrocarbons, transporting the catalyst under the impelling influence of the suspending vapors through an upflow path, disengaging catalyst from vapors at the upper end of said upflow path, thereafter passing the still hot catalyst in downward direction to supply a gravitating compact bed thereof with a continuously replenished upper surface, at least a portion of the catalyst so supplied being passed through a liquid contact zone wherein it is contacted with hydrocarbon oil in liquid state, said oil being at a temperature below that of said catalyst and being vaporized by transfer of contained sensible heat from catalyst passed through said liquid contact zone; passing vaporized oil thus produced, together with the other hydrocarbon vapors disengaged at the upper end of said upflow path, through said compact bed of catalyst while said catalyst is still at hydrocarbon conversion temperature, to effect further reaction and conversion of said vaporized oil and the other hydrocarbon vapors; the proportionate quantity of hydrocarbon in the vapor stream employed for suspending and transporting the catalyst through said upflow path being selected with respect to the difference in temperature of the catalyst and such vapors, that cooling of catalyst during such transportation is not in excess of 100° F. and the body of hot freshly regenerated catalyst originally suspended in said transporting vapor stream being at a temperature and having a heat content at least sufficient to supply the heat required for vaporization of said liquid hydrocarbon oil and for conversion of hydrocarbons of the said vaporized oil as well as the said other hydrocarbon vapors.

2. The method in accordance with claim 1 wherein the quantity of hydrocarbon in the vapor stream so employed for suspending and transporting the catalyst does not exceed one part of such vapors per seven parts of catalyst by weight.

3. The method of hydrocarbon conversion which comprises continuously introducing hot freshly regenerated granular cracking catalyst at a temperature above 900° F. into a transfer zone to form a bed in such zone, introducing into said bed under pressure a vapor stream comprising crackable hydrocarbons at a temperature lower than that of said catalyst, suspending the catalyst in said vapor stream and transporting the catalyst under the impelling influence of said vapor stream through a laterally confined narrow vertical path terminating at its upper end in an expanded disengaging zone, limiting the temperature drop of the catalyst during transportation through said vertical path to less than 100° F. by maintaining the catalyst to oil ratio in said vertical path sufficiently high and a period of contact between the transporting vapor stream and the catalyst sufficiently short during such transportation; separately discharging from said disengaging zone at least a portion of the transporting vapors substantially free of catalyst, passing the catalyst from said disengaging zone to a liquid contact zone, distributing cooler hydrocarbons in liquid state on the catalyst in said liquid contact zone to effect heating of the liquid hydrocarbons by said catalyst and vaporization of the liquid hydrocarbons, collecting the catalyst after engagement with said liquid hydrocarbons as a compact gravitating bed, contacting said compact gravitating bed of catalyst under conversion conditions with the vaporized liquid hydrocarbons and with the hydrocarbon vapors discharged from said disengaging zone, removing vapor products from said compact bed, regenerating the catalyst by combustion of coke formed therein during contact with the recited hydrocarbons, thereby raising the catalyst temperature and returning the regenerated catalyst to said transfer zone at a temperature above 900° F.

4. The method in accordance with claim 3 wherein the temperature of the catalyst passed to said liquid contact zone is not less than about 900° F.

5. The method in accordance with claim 3 wherein said liquid hydrocarbons distributed on the catalyst in said liquid contact zone comprise a fractionated condensate of the vapor products removed from said compact bed.

6. The method in accordance with claim 3 wherein the crackable hydrocarbons in said vapor stream introduced into said transfer zone comprise vapor effluent from flash vaporization of a mineral oil and said liquid hydrocarbons comprise at least part of the higher boiling fraction of the same mineral oil.

7. The method in accordance with claim 3 wherein at least 75% of the catalyst from said disengaging zone is passed through said liquid contact zone.

8. The method in accordance with claim 3 wherein a minor portion of the catalyst from said disengaging zone is passed to said compact gravitating bed, without passing through said liquid contact zone.

9. The method in accordance with claim 3 wherein said granular cracking catalyst is activated clay and the freshly regenerated catalyst is hydrated by contact with steam prior to admission to said transfer zone.

10. The method in accordance with claim 3 wherein the average velocity of the transporting vapor stream in said vertical path is such that the stream traverses said path from said transfer zone to said disengaging zone in not more than about fifteen seconds.

REUBEN T. SAVAGE.
EDWIN H. IVEY, JR.

References Cited in the file of this patent

UNITED STATES PATENTS

| Number | Name | Date |
|---|---|---|
| 2,412,152 | Huff | Dec. 3, 1946 |
| 2,432,344 | Sinclair | Dec. 9, 1947 |
| 2,440,475 | Jacomini | Apr. 27, 1948 |
| 2,458,165 | Holm | Jan. 4, 1949 |
| 2,459,824 | Leffer | Jan. 25, 1949 |
| 2,463,623 | Huff | Mar. 8, 1949 |
| 2,490,774 | Bland | Dec. 13, 1949 |
| 2,499,304 | Evans | Feb. 28, 1950 |
| 2,587,670 | Weinrich | Mar. 4, 1952 |